(12) United States Patent
Davis

(10) Patent No.: US 11,074,637 B2
(45) Date of Patent: Jul. 27, 2021

(54) SELF-CHECKOUT ARRANGEMENTS

(71) Applicant: Digimarc Corporation, Beaverton, OR (US)

(72) Inventor: Bruce L. Davis, Lake Oswego, OR (US)

(73) Assignee: Digimarc Corporation, Beaverton, OR (US)

(*) Notice: Subject to any disclaimer, the term of this patent is extended or adjusted under 35 U.S.C. 154(b) by 5 days.

(21) Appl. No.: 16/263,504

(22) Filed: Jan. 31, 2019

(65) Prior Publication Data
US 2019/0236684 A1 Aug. 1, 2019

Related U.S. Application Data

(63) Continuation of application No. 14/971,747, filed on Dec. 16, 2015, now abandoned.

(60) Provisional application No. 62/096,821, filed on Dec. 24, 2014.

(51) Int. Cl.
| | |
|---|---|
| *G06Q 30/06* | (2012.01) |
| *H04N 5/225* | (2006.01) |
| *H04N 7/18* | (2006.01) |
| *B62B 5/00* | (2006.01) |

(52) U.S. Cl.
CPC ....... *G06Q 30/0633* (2013.01); *B62B 5/0096* (2013.01); *G06Q 30/0639* (2013.01); *H04N 5/225* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 5,287,266 A | 2/1994 | Malec | |
| 6,092,725 A * | 7/2000 | Swartz | G06Q 30/06 235/380 |
| 6,725,206 B1 | 4/2004 | Coveley | |
| 6,854,656 B2 * | 2/2005 | Matsumori | G06K 7/10851 235/375 |

(Continued)

FOREIGN PATENT DOCUMENTS

WO 06085745 A1 8/2006

OTHER PUBLICATIONS

Galande Jayshree, RFID Based Automatic Billing Trolley, 2008 Certified Journal, vol. 4, Issue 3, Mar. 2014, International Journal of Emerging Technology and Advanced Engineering (Year: 2014).*

*Primary Examiner* — William J Allen
*Assistant Examiner* — Maria S. P. Heath
(74) *Attorney, Agent, or Firm* — Digimarc Corporation

(57) ABSTRACT

Self-checkout technologies for retail stores are improved by incorporation of enhanced fraud detection arrangements. For example, if a shopper enters an item on a self-checkout tally, while positioned at a location remote from the normal stock location for that item, a responsive action may be taken. Likewise, if a shopper enters the same item on a self-checkout tally twice, at widely separated times, a responsive action may be taken. These responsive actions can include dispatching a store clerk to assist the shopper, or increasing a risk score that is repeatedly re-calculated during the shopper's visit. A great variety of other features and arrangements (e.g., powering arrangements for mobile phones in shopping carts) are also detailed.

13 Claims, 2 Drawing Sheets

(56) References Cited

U.S. PATENT DOCUMENTS

| | | |
|---|---|---|
| 8,462,212 B1 | 6/2013 | Kundu |
| 9,892,438 B1* | 2/2018 | Kundu ............... G06Q 30/0609 |
| 2002/0104887 A1 | 8/2002 | Schlieffers |
| 2004/0111320 A1 | 6/2004 | Schlieffers |
| 2004/0153663 A1 | 8/2004 | Clark |
| 2006/0243798 A1 | 11/2006 | Kundu |
| 2006/0259371 A1* | 11/2006 | Perrier ............... G06Q 10/087 705/27.1 |
| 2009/0268939 A1 | 10/2009 | Connell, II |
| 2009/0272801 A1 | 11/2009 | Connell, II |
| 2010/0059589 A1 | 3/2010 | Gonclaves |
| 2010/0072715 A1 | 3/2010 | Crum |
| 2010/0096450 A1 | 4/2010 | Silverbrook |
| 2010/0287057 A1 | 11/2010 | Kamijoh |
| 2010/0318440 A1 | 12/2010 | Coveley |
| 2011/0274094 A1 | 11/2011 | Measson |
| 2011/0295704 A1 | 12/2011 | Edwards |
| 2012/0041845 A1 | 2/2012 | Rothschild |
| 2012/0095853 A1 | 4/2012 | Davis |
| 2012/0169879 A1 | 7/2012 | Libal |
| 2012/0205433 A1 | 8/2012 | Paradise |
| 2012/0208592 A1 | 8/2012 | Davis |
| 2012/0214515 A1 | 8/2012 | Davis |
| 2013/0103608 A1 | 4/2013 | Sakamoto |
| 2013/0268357 A1 | 10/2013 | Heath |
| 2013/0317916 A1 | 11/2013 | Roberts |
| 2013/0339115 A1 | 12/2013 | Soldate |
| 2014/0022078 A1* | 1/2014 | Brenner ............... G09F 27/00 340/568.2 |
| 2014/0052555 A1 | 2/2014 | Macintosh |
| 2014/0108195 A1 | 4/2014 | Stawar |
| 2014/0111380 A1 | 4/2014 | Tarlow |
| 2014/0220883 A1 | 8/2014 | Shrivastava |
| 2014/0263631 A1 | 9/2014 | Muniz |
| 2014/0304107 A1 | 10/2014 | Mcallister |
| 2014/0316916 A1 | 10/2014 | Hay |
| 2014/0338987 A1 | 11/2014 | Korbres |
| 2014/0343846 A1 | 11/2014 | Patel |
| 2014/0365334 A1 | 12/2014 | Hurewitz |
| 2015/0006320 A1 | 1/2015 | Goulart |
| 2015/0025969 A1 | 1/2015 | Schroll |
| 2015/0066802 A1 | 3/2015 | Goulart |
| 2015/0095161 A1 | 4/2015 | Goel |
| 2015/0119076 A1 | 4/2015 | Cohen |
| 2015/0127414 A1 | 5/2015 | Gopalakrishnan |
| 2015/0127478 A1 | 5/2015 | Bloms |
| 2015/0154675 A1 | 6/2015 | Todasco |
| 2015/0170252 A1 | 6/2015 | Koo Tze Mew |
| 2015/0206096 A1 | 7/2015 | Fernandez |
| 2015/0242764 A1 | 8/2015 | Subbaraj |
| 2015/0254704 A1 | 9/2015 | Ball |
| 2015/0262116 A1 | 9/2015 | Li |
| 2015/0278888 A1 | 10/2015 | Mason |
| 2015/0341890 A1 | 11/2015 | Vukadinovic |
| 2015/0348384 A1 | 12/2015 | Swetonic |
| 2017/0213201 A1 | 7/2017 | Quintero Traverso |

\* cited by examiner

SELF-CHECKOUT ARRANGEMENTS

RELATED APPLICATION DATA

This application is a continuation of application Ser. No. 14/971,747, filed Dec. 16, 2015, which claims priority to provisional application 62/096,821, filed Dec. 24, 2014. The disclosures of these prior applications are incorporated herein by reference.

INTRODUCTION

While shopper self-checkout at grocery stores has been gaining popularity in Europe, it has not been as quick to gain a foothold in the United States. Adoption of self-checkout technology may be accelerated by enhancing fraud-protection measures.

The present disclosure details a variety of risk-mitigation technologies that can aid in reducing self-checkout fraud.

For example, if a shopper enters an item on a self-checkout tally, while positioned at a location remote from the normal stock location for that item, a responsive action may be taken. Likewise, if a shopper enters the same item on a self-checkout tally twice, at widely separated times, a responsive action may be taken. These responsive actions can include dispatching a store clerk to assist the shopper, or increasing a risk score that is repeatedly re-calculated during the shopper's visit.

The foregoing and other features and advantages of the present technology will be more readily apparent from the following detailed description, which proceeds with reference to the drawings.

DETAILED DESCRIPTION

The present technology expands on applicant's earlier work, detailed in patent documents 20120214515 (now U.S. Pat. No. 9,183,580) and 20140052555 (now U.S. Pat. No. 9,129,277), which are incorporated by reference herein and form part of the present specification.

Figure 1:
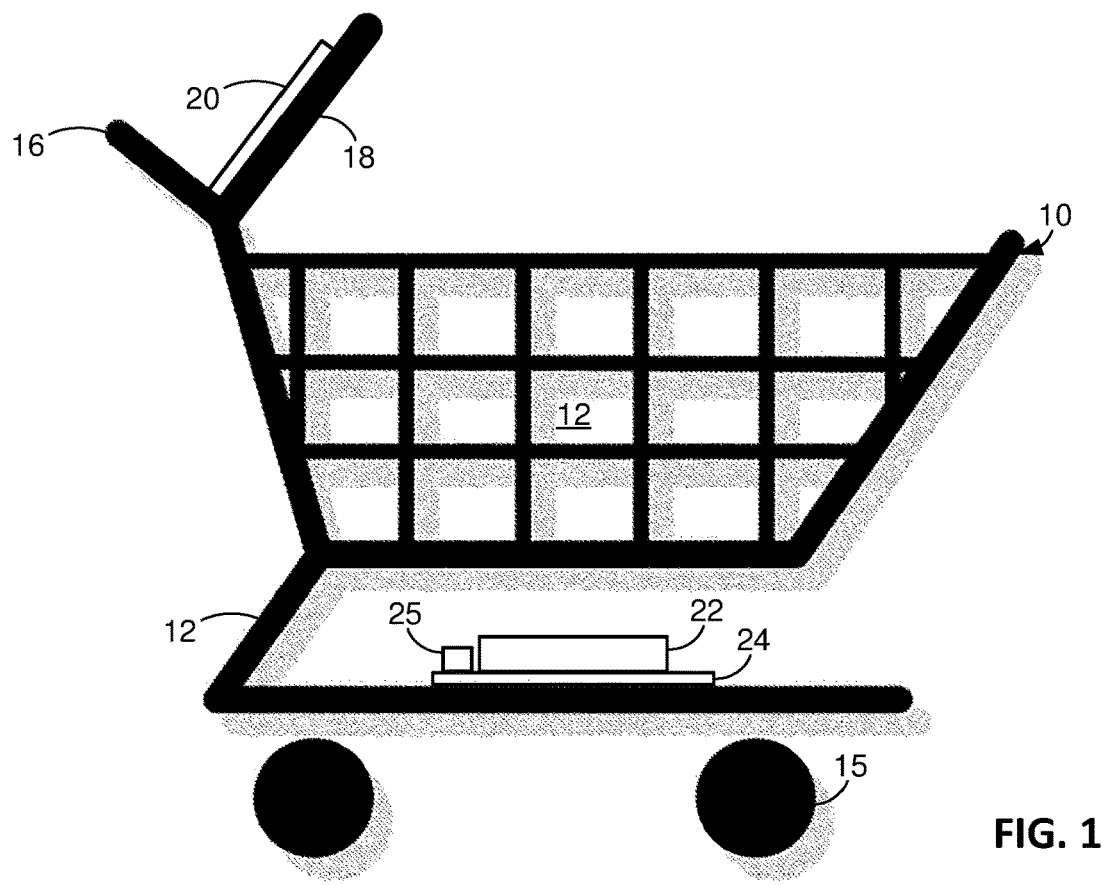
FIG. 1 illustrates a shopping cart including certain features detailed here.

In accordance with one aspect of the present technology, a shopping cart 10 (FIG. 1) includes a frame 12 conveying a basket 14 on casters 15. Near a handle 16 of the cart is an inclined pad 18 on which a shopper's smartphone 20 or other mobile device rests. On a bottom shelf of the cart is a battery 22. Wiring (not shown) links the battery 22 and the pad 18. The cart may include other electronics 25, such as an audio or wireless sensor, or a Bluetooth beacon.

Figure 2:
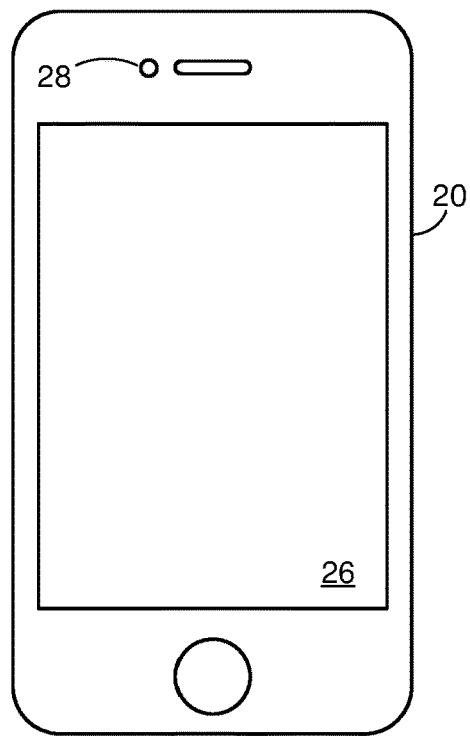
FIG. 2 shows an illustrative cell phone.

In addition to powering any electronics provided with the cart, the battery 22 also serves to charge the shopper's smartphone 20 (FIG. 2). Desirably, power is provided from the battery to the phone by an inductive charging arrangement, integrated into the pad 18. As is familiar, inductive chargers are wireless, in the sense that no wire couples the power source to the phone. Instead, a first induction coil in the pad creates an alternating electromagnetic field, and a second induction coil in the phone takes power from the electromagnetic field and converts it back into electrical current to charge the phone's battery. (Inductive charging arrangements are further detailed in patent documents U.S. Pat. No. 5,821,731 and 20070279002.) Desirably, no wired connection to the smartphone 20 exists, affording the shopper maximum flexibility in placing and removing the smartphone. However, in alternate embodiments, a charging cable (e.g., a USB cable) can couple the phone to the cart battery 22.

The cart 10 further includes an inductive charging arrangement 24 that serves to charge the cart battery. A corresponding charging apparatus can be distributed through the floor of a store, but more commonly is located in the floor of a corral where the carts are stored for use. That floor-based charger is powered through commercial mains power. (Alternatively, the cart battery 22 can be charged via wired contacts formed on a retaining rail in the cart corral, which engage with wired contacts on each cart. A retaining rail arrangement that can be adapted for charging in this manner is shown in U.S. Pat. No. 6,142,283. Other contact-based charging arrangement for shopping cart batteries are detailed in U.S. Pat. Nos. 5,064,012 and 3,652,103.)

The shopper's mobile device 20 can be conventional and include a touchscreen 26 and various sensors—including a front-facing camera 28 and a rear-facing camera (not shown). When the mobile device rests on the pad 18 in the cart, one or both of these cameras serves as a scanner device by which the shopper can add items to a checkout tally, as they are placed in the cart. (The shopper may have one or more reusable bags open in the cart, and may place items directly into a bag after scanning.) As is familiar from applicant's earlier applications, items may be identified in various manners, including barcode reading, object recognition, and digital watermark decoding.

Alternatively, the shopper may lift mobile device 20 from the pad 18 and scan product-identifying information from an item before it is placed in the cart (e.g., while the item is still on a store shelf). This may be done to discover product information, such as cost, nutritional information, expiration date, etc. The shopper can instruct the device to add the item to the checkout tally, and then place the item into the cart. In still other arrangements, the user may first place the item in the cart, and then scan the item with the device.

When the shopper has obtained all the items needed, the mobile device 20 is used to make payment to the store, per the accumulated checkout tally. Known electronic payment arrangements can be employed, including the PayPal and Apple Pay services, and the system detailed in applicant's patent publications 20140244514 and 20150227925.

While self-checkout has been gaining popularity in Europe (commonly using special purpose mobile terminals, rather than conventional smartphones), it has not been as quick to gain a foothold in the United States. Adoption of self-checkout technology may be accelerated by enhancing protection against pilferage.

Even though supermarkets and other retail stores commonly include security cameras that may be monitored by store personnel, applicant has found that there are some fraudulent ploys that can escape detection by such surveillance. One is for a dishonest shopper to seemingly present an item for scanning by a mobile terminal, but orient the item so that its barcode is not visible to the scanner. For digitally-watermarked items (in which the identification data spans all of the packaging), a dishonest shopper may "palm" the item, so that the shopper's hand blocks the camera from sensing the item. To store personnel watching a security camera, nothing appears amiss; it appears the item was scanned before placing it into the cart.

One way such loss can be detected is by estimating (manually, or by machine vision techniques) the number of items in a cart, and comparing that to a number of items on that cart's checkout tally. (This can be done either in the shopping aisles, or as the cart approaches the exit of the store.) Another detection technique is to have a weight sensor in the cart, and check that the sensed weight of the contents corresponds to a weight calculated from individual weight data about items on the checkout tally. In either case, if something seems amiss, a store clerk can be dispatched to politely investigate.

But these cross-checks are susceptible to scams as well. A shopper who puts an unscanned item into the cart may seek to conceal the fraud by surreptitiously scanning—for a second time—a less expensive item that is already in the cart. That less expensive item now appears twice on the tally, increasing the cart's item count and calculated weight, while a more expensive item leaves the store without full payment.

Figure 3:
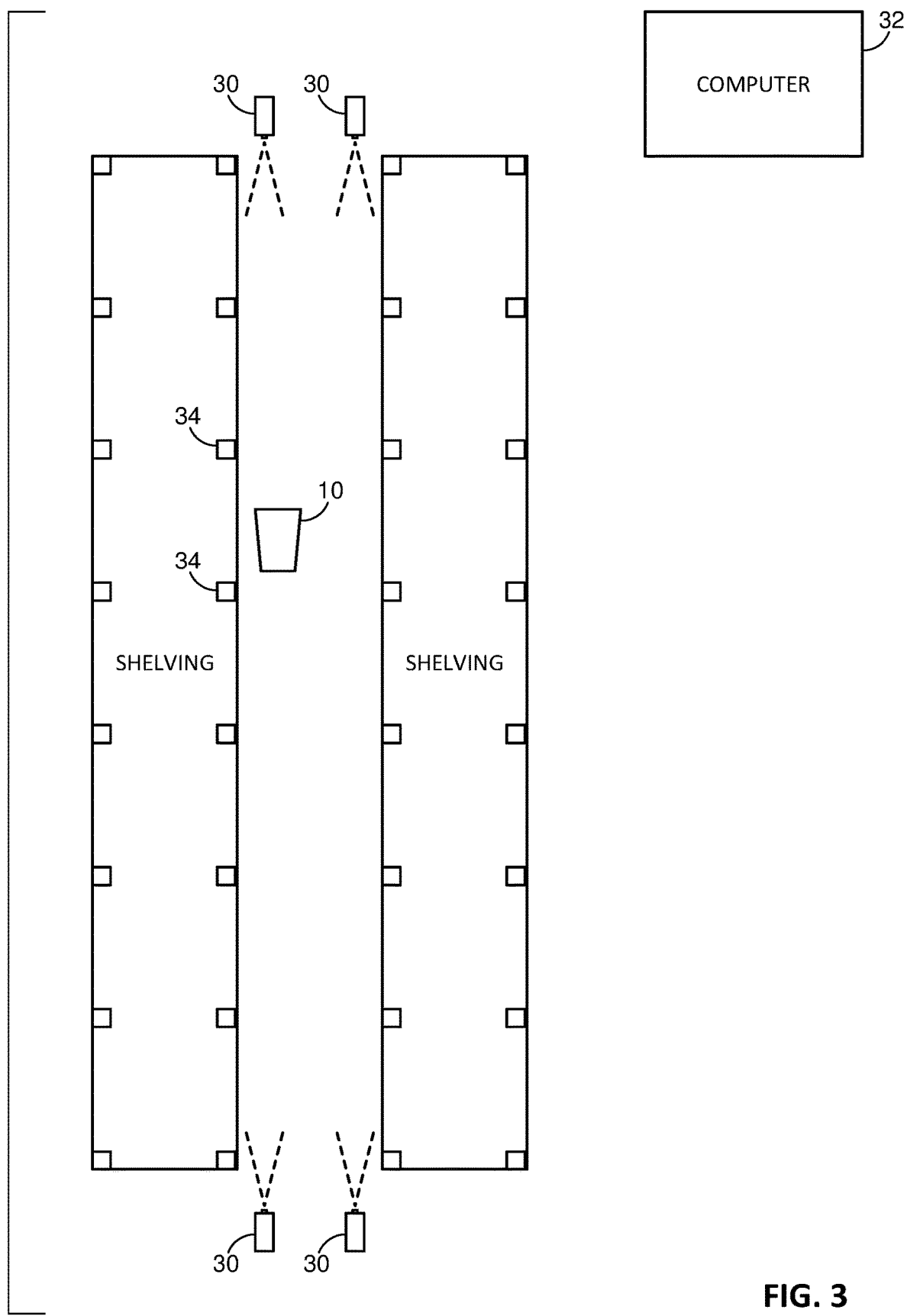
FIG. 3 depicts aspects of the presently-detailed technology, in a retail store.

In accordance with a further aspect of the present technology, the camera of a shopper's mobile device is employed to identify items placed in a cart and compile a checkout tally, as above. The tally may further include data indicating the location in the store at which each item was added to the tally. Image data additionally is captured from one or more store cameras 30 (FIG. 3), which are affixed to the store ceiling, to shelves, etc. This latter imagery is wirelessly communicated to a store computer system 32, which includes software that performs activity classification—identifying the time points when captured imagery seems to depict a shopper placing an item in a cart. (Multiple views of the scene aids in this analysis, since a cart can be recognized more reliably, and a 3D model can be estimated that reveals when an item is lowered into the cart by the shopper.)

The two sets of data thereby collected (e.g., the shopper's self-tally, and the data from infrastructure sensors) are then analyzed for anomalies.

One anomaly is detection of an item placed in a cart at a time that does not correspond with an entry on the checkout tally compiled by the user device. If store computer 32, in its analysis of imagery from cameras 30, finds that an item was likely placed in a particular cart at 1:42:03 pm, but no entry on the cart's tally (compiled by the shopper's mobile device) is found within a threshold interval (e.g., within 15, 30 or 60 seconds of this timepoint), then the event is flagged as suspicious.

Another anomaly is detection of an item placed in a cart at a time that coincides with entry of an item on the checkout tally, but the item entered on the tally is not stocked on a shelf near the cart's current location (e.g., such item is stocked more than 10 or 20 feet away). This, too, is flagged as suspicious.

Still another anomaly is entry of a duplicate item on the cart's tally, more than a threshold interval (e.g., more than 15 or 30 seconds) after the first instance of that item was entered onto the cart's tally.

Each such event can add (or subtract) points from a risk score for that cart (or for that shopper)—with the number of points dependent on parameters of the event. For example, if an item is added to a checkout tally at one position, but is stocked at a second position that is twenty feet away, 10 points may be added to the risk score. If the item is stocked at a second position that is two aisles away, 50 points may be added to the risk score.

Score information is relayed to a phone or other device monitored by the store's customer service personnel. If a high risk score is noted (e.g., having a value above a threshold value), a clerk can be dispatched to help the shopper compile an accurate tally.

The risk score may further take into consideration one or more other factors learned from analysis of records maintained by the computer 32 (e.g., by data mining), involving confirmed irregularities in shopper-compiled check-out tallies.

One involves time of day. In analyzing historical records, the computer 32 may discover that self-checkout irregularities seem to be more common in the 2:00 hour on Saturday afternoons, than in any other hour (e.g., normalized to a percentage of shoppers in the store). Conversely, the computer may discover that the smallest percentage of shoppers having difficulty in compiling accurate shelf-checkout tallies is found in the 9:00 am hour on weekdays. Each hour of the week may be scored in this fashion—with a metric indicating a degree of increased (or decreased) loss experience based on historical data analysis.

Another risk factor may be particular aisles, or regions within particular aisles, in which shoppers pause. For example, mining of historical records may suggest that shoppers who pause near a particular section of high priced specialty foods (e.g., aged balsamic vinegars) tend to be associated with greater risks of loss than those who don't. Each location in the store may be scored in this fashion—with a number indicating a degree of increased (or decreased) loss experience based on historical data analysis. (For this purpose, the store may be virtually-divided into discrete zones, e.g., six feet in aisle length—either including shelving on just one side of the aisle, or both sides.) As a shopper pauses at different locations in the store, an aggregate position-based risk score can be compiled, e.g., based on a sum of the scores associated with the various locations.

Relatedly, each SKU in the store may be associated with a loss risk factor—based on data about historical "shrinkage" (pilferage) of such stock from inventory. Zone-based scores may be derived from such product-based factors, e.g., by averaging the risk loss factors for all products found on shelving within three feet of a location at which a shopper's cart pauses.

Analysis of store records may also indicate that items which are properly identified on a shopper's tally may be positively- or negatively-correlated with erroneous self-checkout tallies. For example, a cart listing crackers on its checkout tally may be statistically more likely to have an unreported wedge of cheese than a cart that doesn't list crackers on its checkout tally (or that lists prunes on its checkout tally).

Many other factors can be applied based on identification of particular shoppers. While generalizing loss risks based on demographic factors such age, gender, nationality, etc., is disfavored, some stores may consider such factors. More useful, however, are factors discerned from historical data involving particular shoppers.

For example, if a particular shopper previously has been found to have one or more inaccurate self-checkout tallies, then heightened scrutiny (e.g., in the form of an extra plus-up to a risk score) is certainly appropriate. Conversely, if a shopper is identified as a "regular" at the store, and no irregularity in self-checkout tallies has previously been noted, then such person's risk score may be reduced accordingly by a factor (e.g., by subtraction or division). If a shopper has not previously been noted at the store, a corresponding risk factor may be added.

A recognized shopper's variation from normal habits may also give rise to an adjustment of risk score. If a shopper's historical shopping patterns include, primarily, house-brands and lower-priced cuts of meat, then a visit in which the shopper pauses repeatedly near premium brands, and prime cuts of meat, is unusual. So, too, with different times, or days, of shopping. (A regular 9:00 am Tuesday morning shopper, who appears at 10:30 pm, is acting out of character.) Likewise with departure from a usual length of a store visit. (A shopper who normally spends 45-60 minutes in the store traversing all aisles of the store, before buying a cart-full of groceries, breaks that pattern by visiting the store aisles for just five minutes before heading for the exit door.)

In such circumstances, an increase to the risk score may be warranted. Again, the degree of increase can be tied to particular parameters of the variance.

A variety of methods for generating an aggregate score can be used, depending on the particular circumstances. One technique employs a polynomial approach, where different factors are weighted differently, and combined to produce an aggregate score. The following exemplary scoring equation uses input metrics M1, M2, M2 and M4 to yield a score S for each shopper (or cart). Factors A, B, C, D and exponents W, X, Y and Z can be determined experimentally, or by Bayesian techniques:

$$S=(A*M1)^W+(B*M2)^X+(C*M3)^Y+(D*M4)^Z$$

Desirably, the score is repetitively recalculated throughout the user's visit (e.g., every time the user pauses, or every ten seconds, etc.). If, at any point, the score exceeds a threshold value, an alert is issued to the store, so that action may be taken.

In hindsight, this scoring is akin to that detailed in applicant's patent publications 20120123959 and 20070205266. Those technologies concern detection of patterns that may be associated with increased (or decreased) incidences of fraud—in those cases involving ID verification (e.g., for drivers licenses). The principles detailed in those prior publications are likewise applicable in the present context to help identify patterns that may be associated with fraud. For example, arrangements employing neural networks or factor analysis (c.f. Kim, "Factor Analysis," Sage Publications, 1979) may be employed.

It will be recognized that the scoring approaches detailed above are not suited for manual performance, by humans. For example, the "signals" discovered by machine-based mining of historical data (e.g., correlations of different factors with historical loss experience) are typically too weak to be discerned by humans from review of the historical data, given any practical time constraints. (The average supermarket stocked 42,214 different items in 2014. A typical supermarket checks-out hundreds of shoppers each day, including carts aggregating tens of thousands of items each week.) The repetitive recalculation of a risk score is beyond practical human capabilities. Similarly with other aspects of the technology.

To review, in one particular embodiment, a method includes extracting identifier data from imagery captured by a user device from an item. A data structure is consulted with the extracted identifier to obtain a corresponding item identifier. This item identifier is entered on a tally with associated time-stamp data. The tally is examined for duplicate item identifiers. The method determines that a time difference between entry of a first of the duplicate item identifiers on the tally, and entry of a second of the duplicate item identifiers on the tally, is greater than a threshold value (e.g., is greater than 15 seconds). A response is then taken in response to such determination.

Such method can also include determining, by detection of a signals emitted by one or more wireless beacons, the shopper's location in an aisle of the store, at times that the duplicate items were added to the tally. A database is consulted to identify a stock location for the duplicate items. When the stock location is within six feet of the determined shopper location, a first action is taken, and when the stock location is greater than six feet away, a second (different) action is taken. In fact, the second action may further depend on whether the determined shopper location is in the same aisle as the stock location, or in a different aisle, with the second actions varying accordingly.

The problems addressed by the present technologies include problems that arise from use of other technologies. For example, while self-checkout technologies bring convenience to the shopper, and labor savings to the retailer, they bring with them new risks of loss—risks that embodiments of the present technology help identify so that they can be addressed.

CONCLUDING REMARKS

It will be recognized that the foregoing arrangements address various issues that have deterred adoption of self-checkout in retail stores. For example, the detailed technologies sense circumstances associated with increased risks of loss, permitting stores to appropriately deploy personnel to assist shoppers in compiling accurate self-checkout tallies. In some embodiments, store infrastructure that is already present for other purposes (e.g., security cameras) is re-purposed to aid in activity classification and 3D shopper modeling.

Having described and illustrated the principles of the technology with reference to illustrative examples, it will be recognized that the technology is not so limited.

For example, while the detailed arrangements computed a score that increased with fraud risk, in other arrangements a score that decreased with fraud risk (e.g., a trust score) can be employed.

Similarly, while reference was made to use of store infrastructure cameras to sense a shopper's placement of an item in a cart, it will be recognized that other sensors can additionally or alternatively be employed for this task. Motion or weight sensors attached to store shelving are one such alternative, and can detect removal of items.

Although the detailed arrangements use shopping app software on the mobile device to perform product recognition, compile a checkout tally, and effect payment, in other embodiments such component functions can naturally be performed otherwise—including by operating system software on a shopper's device, by the store computer 32, by a remote server, distributed between such devices, etc.

Naturally, the historical correlations between different factors and different loss experiences can be based on more than data from a single store. For example, data from a chain of stores—encompassing hundreds or thousands of locations—can be considered.

Shopper or cart location within the store can be determined by various means, including by reference data that associates different regions in a field of view of each camera 30 with different locations in a store aisle. Alternatively, the cart 10 can be equipped with a low power Bluetooth beacon or RFID chip that is sensed by a proximate sensor 34 mounted to store shelving. Still further, geolocation by known WiFi or audio techniques can be employed, based on signals received by a sensor in the cart and relayed to the store computer system, etc.

Speaking of beacons, applicant's inventive combinations include use of the presently-described technologies in conjunction with beacon and other signaling arrangements described in application Ser. No. 14/739,251, filed Jun. 15, 2015 (now published as 20160044460).

Activity classification from surveillance video has been an interest of researchers for many years, and the science has been extensively developed. See, e.g., Trinh, et al, Detecting human activities in retail surveillance using hierarchical finite state machine, IEEE Int'l Conf. on Acoustics, Speech and Signal Processing (ICASSP), 2011, pp. 1137-1340; Trinh, et al, Multimodal ranking for non-compliance detection in retail surveillance, IEEE Workshop on Applications of Computer Vision, 2012, pp. 241-246; Popoola, et al, Video-based abnormal human behavior recognition—a review, IEEE Trans. on Systems, Man, and Cybernetics, Part C: Applications and Reviews, 42.6, 2012, pp. 865-878; Qian, et al, Recognition of human activities using SVM multi-class classifier, Pattern Recognition Letters 31.2, 2010, pp. 100-111; Wang, et al, Correspondence-free activity analysis and scene modeling in multiple camera views, IEEE Trans. on Pattern Analysis and Machine Intelligence, 32.1, 2010, pp. 56-71; and Hoai, et al, Joint segmentation and classification of human actions in video, IEEE Conf. on Computer Vision and Pattern Recognition (CVPR), 2011, pp. 3265-3272, and references cited therein.

A cart, or shopper, can be identified in various ways. For example, a cart can be equipped with identification means, such as an RFID chip, a Bluetooth beacon, or visual indicia that can be recognized by cameras 30. A shopper can be identified by a physical or virtual store loyalty card, or payment card, employed during the shopper's visit, or by other unique-identifying data presented by the shopper. Facial- or other biometric-identification can also be employed. The shopper can be demographically classified (while staying anonymous) by apparent gender, estimated age, clothing color, etc., as is familiar to artisans.

Since the cart includes the mobile device at a posture where it is readable to the shopper (e.g., for presentation of the shopping tally), the device can also present other information of potential interest to the shopper, such as store map information, and location- or product-based offers. (E.g., if a shopper has added peanut butter to their cart, the shopping app can also present a coupon for jelly, or simply note the location of such companion product on a store map).

References to wireless technology should be understood to include not just electromagnetic radiation (e.g., light and radio signals), but also acoustic pressure waves (e.g., audio—both within and above the human range of hearing).

In implementing the presently-described technology, the artisan has a great deal of freedom concerning the parameters involved. Consider a parameter specifying how remote a shopper must be from an item's stock location, when the item is entered onto the checkout tally, in order for the action to result in an increase in risk score. Some implementers might set a threshold distance at six feet. Others might set a threshold at 15 feet, while still others wouldn't increase the risk score unless the shopper, and the item's stock location, are located in different aisles. Similarly with other concepts of spatial nearness, or proximity. In one system, two locations are near if they are within six feet. Others are near if they are within 10 feet. Etc. Likewise with concepts of temporal proximity. In one implementation, a risk score may be increased when duplicate items are entered onto a shopper's tally more than 10 seconds apart. In another implementation, the risk score may not be increased unless the duplicate items are entered at times that are at least 30 seconds apart. (The tally data typically includes timestamp information indicating, to the second, the time at which each item was scanned by the user and entered onto the tally.)

To keep this specification concise as required by the Patent Act, applicant has omitted certain mundane details that are straightforward to artisans implementing such technology. For example, decoding barcode indicia, transmitting product identification data to a database, displaying product information returned from a database, presenting coupon offers, etc., are all familiar to artisans in the relevant fields.

As should be evident, the technology detailed herein finds utility with all manner of user devices. Not just smartphones, but also tablets, digital cameras, wrist- and head-mounted systems and other wearable devices, etc., can all make use of the principles detailed herein.

Particularly contemplated mobile devices include the Google Glass product; the Apple iPhone 6; smartphones following Google's Android specification (e.g., the Galaxy S4 phone, manufactured by Samsung, and the Google Moto X phone, made by Motorola), and Windows 8 mobile phones (e.g., the Nokia Lumia 1020).

The design of smartphones is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee, Thread or Bluetooth, and/or wired, such as through an Ethernet local area network, etc.).

The processes and system components detailed in this specification can be implemented as instructions for computing devices, including general purpose processor instructions for a variety of programmable processors, such as microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions can be implemented as software, firmware, etc. These instructions can also be implemented in various forms of processor circuitry, including programmable logic devices, and field programmable gate arrays (e.g., the Xilinx Virtex series devices). Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by non-transitory tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Another form of implementation is electronic circuitry that has been custom-designed and manufactured to perform some or all of the component acts, as an application specific integrated circuit (ASIC).

To realize such an implementation, the relevant module(s) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Essentially all of the functions detailed above can be implemented in such fashion, e.g., decoding a watermark or barcode payload from captured imagery, activity classification, etc.

Patent application Ser. No. 14/842,575, filed Sep. 1, 2015 (now published as 20170004597), details particular hardware implementations for watermark detection, which are suitable for use with the present technology.

As indicated above, reference to a "module" that performs a certain function should be understood to encompass one or more items of software, and/or one or more hardware circuits—such as an ASIC as just-described.

As indicated, different configurations of the functionality can be implemented on different devices. For example, in a system in which a smartphone communicates with a computer at a remote location, different tasks can be performed exclusively by one device or the other, or execution can be distributed between the devices. Extraction of watermark information from imagery is an example of a process that can be distributed in such fashion. Activity classification is another. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

The in-store mobile shopping app can form part of, or incorporate features from, applicant's Discover app. This app and related technology are detailed, e.g., in published patent applications 20110212717, 20110161076, 20120208592, 20130311329, and 20140052555, and in pending application Ser. No. 14/251,229, filed Apr. 11, 2014 (now published as 20150016712). Applicant's other work that is relevant to the present technology includes that detailed in patent documents 20120214515 and 20140164124.

Other cart-based shopping systems are detailed in patent documents U.S. Pat. No. 5,287,266, 20040111320, 20100072715, 20100096450, and 20140108195.

Patent documents 20040153663 and 20120123959 provide additional information on multi-factor risk assessment.

This specification has addressed several different embodiments. It should be understood that the methods, elements and concepts detailed in connection with one embodiment can be combined with the methods, elements and concepts detailed in connection with other embodiments. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) The present specification should be read in the context of these cited documents. These documents disclose technologies and teachings that can be incorporated into the arrangements detailed herein, and into which the technologies and teachings detailed herein can be incorporated. The reader is presumed to be familiar with such prior work.

In view of the wide variety of embodiments to which the principles and features discussed above can be applied, it should be apparent that the detailed embodiments are illustrative only, and should not be taken as limiting the scope of the invention. Rather, the subject technology includes all such modifications as may come within the scope and spirit of the following claims and equivalents thereof.

The invention claimed is:

1. An improved fraud deterrence system for a retail store, to flag as potentially fraudulent a self-checkout tally including duplicate items, generated by a shopper scanning identifiers from items as the items are placed in a shopping cart, the system comprising:
    locating means for determining a position of the cart or shopper in the store;
    one or more processors, with associated memory, the memory containing software instructions that configure the fraud deterrence system to perform acts including:
    receiving a first signal from said locating means, said first signal being associated with entry of a first item on the self-checkout tally;
    receiving a second signal from said locating means, said second signal being associated with entry of a second item on the self-checkout tally;
    analyzing the self-checkout tally for two duplicate items, said tally identifying each item scanned for purchase and a timestamp for each scan, said analyzing including identifying a first entry on the tally for a particular item with a first timestamp, and identifying a second entry on the tally for said particular item with a second timestamp;
    computing a time difference between the first timestamp and the second timestamp;
    increasing a value of a risk score based on said computed time difference, wherein a longer time interval between scanning of the two duplicate items corresponds to a higher risk of fraud;
    determining, from the received first signal, information about a first location in the store at which the first duplicate item was entered on the tally;
    determining a distance between the first location and a stock location for said duplicate item;
    adjusting the value of said risk score by a first amount based on said first determined distance;
    determining, from the received second signal, information about a second location in the store at which the second duplicate item was entered on the tally;
    determining a distance between the second location and said stock location;
    adjusting the value of said risk score by a second amount based on said second determined distance;
    wherein a greater distance between the first or second locations, and said stock location, corresponds to a higher risk of fraud;
    wherein the risk score is a function of the computed time difference between the first and second timestamps, the spatial distance between the first location and the stock location, and the spatial distance between the second location and the stock location; and
    determining that the risk score exceeds a threshold value and, in response to said determining, sending information to customer service personnel so that a clerk can be dispatched to help the shopper compile an accurate checkout tally.

2. The system of claim 1 in which the first and second amounts are different, and are both non-zero.

3. The system of claim 1 that further includes one or more cameras, wherein said instructions further configure the system to determine multi-symbol item identifiers from the first item by decoding pixel data collected by said one or more cameras, said decoding including estimating a pose, including rotation, of a data symbology within the pixel data, using said estimated pose in extracting information from the pixel data, and checking successful decoding by reference to check data included with the extracted information; and entering said decoded item identifier on the self-checkout tally.

4. The system of claim 1 in which the locating means for determining the position of the cart or shopper in the store comprises (a) a receiver conveyed by the cart or shopper that receives a wireless signal transmitted from a wireless device mounted in a store aisle, or (b) a receiver mounted in a store aisle that receives a wireless signal transmitted from a wireless device conveyed by the cart or shopper.

5. The system of claim 1 in which said instructions further configure the system to perform acts including:
    (a) with a camera, capturing imagery of an item presented for purchase by a second shopper;
    (b) processing the captured imagery to decode a barcode or digital watermark indicia, yielding a product identifier;
    (c) checking a database to determine a product name and price corresponding to the product identifier;
    (d) entering the product name and price on a checkout tally for the second shopper;
    (e) repeating acts (a)-(d) for one or more other items;
    (f) summing the prices entered on the tally; and
    (g) charging the second shopper the summed price for said items.

6. An improved fraud deterrence system for a retail store, to flag as potentially fraudulent a self-checkout tally including duplicate items, generated by scanning identifiers from items with a camera-equipped device as the items are placed in a shopping cart, the system comprising:
    a wireless device and plural wireless receivers, the device being affixed to the cart and transmitting a low power wireless signal for receipt by the plural wireless receivers, the plural wireless receivers being disposed in an aisle of the store and sensing signals issued by the wireless to determine position of the cart in the aisle of the store;
    one or more processors, with associated memory, the memory containing software instructions that configure the fraud deterrence system to perform acts including:
    receiving a first signal from one of said plural wireless receivers, said first signal being associated with entry of a first item on the self-checkout tally;
    receiving a second signal from one of said plural wireless receivers, said second signal being associated with entry of a second item on the self-checkout tally;
    analyzing the self-checkout tally for two duplicate items, said tally identifying each item scanned for purchase and a timestamp for each scan, said analyzing including identifying a first entry on the tally for a particular item with a first timestamp, and identifying a second entry on the tally for said particular item with a second timestamp;
    computing a time difference between the first timestamp and the second timestamp;
    increasing a value of a risk score based on said computed time difference, wherein a longer time interval between scanning of the two duplicate items corresponds to a higher risk of fraud;
    determining, from the received first signal, information about a first location in the store at which the first duplicate item was entered on the tally;
    determining a distance between the first location and a stock location for said duplicate item;
    adjusting the value of said risk score by a first amount based on said first determined distance;

determining, from the received second signal, information about a second location in the store at which the second duplicate item was entered on the tally;
determining a distance between the second location and said stock location;
adjusting the value of said risk score by a second amount based on said second determined distance;
wherein a greater distance between the first or second locations, and said stock location, corresponds to a higher risk of fraud; and
wherein the risk score is a function of the computed time difference between the first and second timestamps, the spatial distance between the first location and the stock location, and the spatial distance between the second location and the stock location; and
determining that the risk score exceeds a threshold value and, in response, sending information to customer service personnel, so that a clerk can be dispatched to help compile an accurate checkout tally.

7. The system of claim 6 in which the first and second amounts are different, and are both non-zero.

8. The fraud deterrence system of claim 6 in which the software instructions configure the system to determine that said computed time difference exceeds fifteen seconds, and in response, increasing the value of the risk score.

9. The fraud deterrence system of claim 6 in which the software instructions configure the system to increase the value of the risk score by an amount dependent on said computed time difference.

10. The fraud deterrence system of claim 6 which further includes (a) plural overhead surveillance cameras that capture video to help confirm that a shopper scans items placed into the cart, (b) a cart weigh scale that determines item weight data against which weight data corresponding to items on the shopper's self-checkout tally can be checked, or (c) a machine vision system that estimates a number of items in the cart, for comparison with a number of items on the shopper's self-checkout tally.

11. The system of claim 6 that further includes one or more cameras, wherein said instructions further configure the system to determine multi-symbol item identifiers from the first item by decoding pixel data collected by said one or more cameras, said decoding including estimating a pose, including rotation, of a data symbology within the pixel data, using said estimated pose in extracting information from the pixel data, and checking successful decoding by reference to check data included with the extracted information; and entering said decoded item identifier on the self-checkout tally.

12. An improved fraud deterrence system for a retail store, to flag as potentially fraudulent a self-checkout tally including duplicate items, generated by scanning identifiers from items with a camera-equipped device as the items are placed in a shopping cart, the system comprising:
 a wireless beacon or RFID device, and plural wireless receivers, said device being affixed to the cart and transmitting a low power wireless signal for receipt by the plural wireless receivers, the plural wireless receivers being disposed in an aisle of the store and sensing signals issued by the wireless device to determine position of the cart in the aisle of the store;
 one or more processors, with associated memory, the memory containing software instructions that configure the fraud deterrence system to perform acts including:
 receiving a first signal from one of said plural wireless receivers, said first signal being associated with entry of a first item on the self-checkout tally;
 receiving a second signal from one of said plural wireless receivers, said second signal being associated with entry of a second item on the self-checkout tally;
 analyzing the self-checkout tally for two duplicate items, said tally identifying each item scanned for purchase and a timestamp for each scan, said analyzing including identifying a first entry on the tally for a particular item with a first timestamp, and identifying a second entry on the tally for a duplicate of said particular item with a second timestamp, said particular item being stocked at a stock location as indicated in a database;
 computing a time difference between the first timestamp and the second timestamp;
 increasing a value of a risk score based on said computed time difference, wherein a longer time interval between scanning of the two duplicate items corresponds to a higher risk of fraud;
 determining, from the received first signal, information about a first location in the store at which the first item was entered on the tally;
 adjusting said risk score in accordance with a distance between said first location and said stock location for said particular item, wherein a greater distance between said first location and said stock location corresponds to a higher risk of fraud;
 determining, from the received second signal, information about a second location in the store at which the second item was entered on the tally;
 adjusting said risk score in accordance with a distance between said second location and said stock location for said particular item, wherein a greater distance between said first location and said stock location corresponds to a higher risk of fraud;
 determining that the risk score exceeds a threshold value and, in response, sending information to customer service personnel, so that a clerk can be dispatched to help compile an accurate checkout tally.

13. An improved fraud deterrence system for a retail store, to flag as potentially fraudulent a shopper's self-checkout tally including duplicate items, each item on the tally being entered by a tally event sequence including (a) scanning the item with a camera-equipped device to sense item-identification information as the item is placed in a shopping cart, (b) identifying the item from said item-identification information, and (c) entering corresponding item identification data on the tally, the system comprising:
 a plurality of cameras positioned to capture surveillance imagery indicating locations of the shopper or cart;
 one or more processors configured to cause the system to perform acts including:
 logging an event location, derived from the surveillance imagery, in association with each tally event, together with an associated event timestamp;
 analyzing the self-checkout tally for two duplicate items, said analyzing including identifying a first entry on the tally for a particular item and identifying a second entry on the tally for a duplicate of said particular item, said particular item being stocked at a stock location as determined from a database, said duplicate items being entered on said tally by first and second tally events, the first tally event being associated with a first location and a first event timestamp, and the second tally event being associated with a second location and a second event timestamp;
 computing a time difference between the first event timestamp and the second event timestamp;

increasing a value of a risk score based on said computed time difference, wherein a longer time interval between tally events for the two duplicate items corresponds to a higher risk of fraud;

adjusting said risk score in accordance with a distance between said first location and said stock location, wherein a greater distance between said first location and said stock location corresponds to a higher risk of fraud;

adjusting said risk score in accordance with a distance between said second location and said stock location, wherein a greater distance between said second location and said stock location corresponds to a higher risk of fraud; and determining that the risk score exceeds a threshold value and, in response, sending information to customer service personnel, so that a clerk can be dispatched to help the shopper compile an accurate checkout tally.

\* \* \* \* \*